US007669129B2

(12) United States Patent
Mathur

(10) Patent No.: US 7,669,129 B2
(45) Date of Patent: Feb. 23, 2010

(54) GRAPHICAL USER INTERFACE FOR PROVIDING EDITING OF TRANSFORM HIERARCHIES WITHIN AN EFFECTS TREE

(75) Inventor: Shailendra Mathur, Beaconsfield (CA)

(73) Assignee: Avid Technology, Inc., Tewksbury, MA (US)

( * ) Notice: Subject to any disclaimer, the term of this patent is extended or adjusted under 35 U.S.C. 154(b) by 462 days.

(21) Appl. No.: 10/816,291

(22) Filed: Apr. 1, 2004

(65) Prior Publication Data

US 2004/0207665 A1    Oct. 21, 2004

Related U.S. Application Data

(60) Provisional application No. 60/460,635, filed on Apr. 4, 2003.

(51) Int. Cl.
*G06F 3/00* (2006.01)

(52) U.S. Cl. ................... 715/723; 715/720; 715/726

(58) Field of Classification Search ......... 715/716–732, 715/763, 853; 345/723
See application file for complete search history.

(56) References Cited

U.S. PATENT DOCUMENTS

| 5,668,639 | A | * | 9/1997 | Martin | ............... | 380/52 |
| 5,892,506 | A | * | 4/1999 | Hermanson | ............... | 715/500.1 |
| 6,133,914 | A | * | 10/2000 | Rogers et al. | ............... | 345/661 |
| 6,266,053 | B1 | * | 7/2001 | French et al. | ............... | 715/255 |
| 6,377,259 | B1 | * | 4/2002 | Tenev et al. | ............... | 345/440 |
| 6,377,712 | B1 | * | 4/2002 | Georgiev et al. | ............... | 382/293 |
| 6,760,721 | B1 | * | 7/2004 | Chasen et al. | ............... | 707/3 |
| 6,924,821 | B2 | * | 8/2005 | Trinh et al. | ............... | 345/629 |
| 7,581,185 | B2 | * | 8/2009 | Miller et al. | ............... | 715/723 |
| 2003/0085932 | A1 | * | 5/2003 | Samra | ............... | 345/853 |

* cited by examiner

*Primary Examiner*—Ba Huynh
*Assistant Examiner*—Phenuel S Salomon
(74) *Attorney, Agent, or Firm*—Peter J. Gordon; Oliver Strimpel

(57) ABSTRACT

Transformation hierarchies and effects trees may be defined in the same user interface by treating animated transformations as another type of time-varying data stream. Effects operators in the effect tree are provided with an input to receive a transformation. The effects operators can be set to either use a transformation having parameters specified by the user, or use an input transformation, or both. Transform operators may generate an output transform based on user specified parameters or based on a function of data input to the transform operator. If there is no input connected to a transform operator, the transform operator may generate its own local transform. In the user interface, the user can connect the output of one transformation operator to the next (e.g., parent to child) using the same output to input port connections as used for images and effects operators. The result of a graph of transformation operators is then visually connected to the input of the image processing (rendering or rasterizing) effect, such as a DVE, that is capable of using the final transformation. The user can then identify clearly which image effects are consumers of the transformation matrices. Using the data flow user interface, it also becomes possible to supply the same transformation as input to several image processing effects.

5 Claims, 3 Drawing Sheets

GRAPHICAL USER INTERFACE FOR PROVIDING EDITING OF TRANSFORM HIERARCHIES WITHIN AN EFFECTS TREE

CROSS REFERENCE TO RELATED APPLICATIONS

This application claims the benefit of prior filed provisional application number 60/460,635, filed Apr. 4, 2003, and is incorporated herein by reference.

BACKGROUND

In animation and effects products, transformation hierarchies are built using a dedicated user interface, which is typically called a schematic view. A transformation hierarchy specifies, for example, three-dimensional transformations that are concatenated according to the relationships in the tree. In a schematic view, sets of objects are "constrained" to another object by specifying a parent-child relationship between them. These transformations may be used, for example, to perform effects on image sequences. A digital video effect (DVE) is an example of an operator that can use a specific transformation from the schematic view to render a set of images. DVE operators are manipulated in another user interface that defines an image data flow of effects processing, such as an effects tree. The data flow user interface shows a graph of image effect nodes, including the DVE operator that renders the images based on the transformation specified in the schematic view. This schematic view typically is shown separately from any data flow user interface.

There are two primary problems that users face when using schematic views and effects trees. First, the two views are not in context. The user needs to keep a visual association between the transformation nodes in the schematic view and the image-rendering objects that are affected by them. Second, the hierarchy shown in the typical schematic views follows a tree structure, which enforces a parent-child relationship. A parent can have multiple children, but a child cannot have multiple parents. In mathematical terms, this relationship implies that the parent provides a post-transform matrix to a child matrix. However, this data structure or user interface is not amenable to providing a single pre-transform matrix to multiple objects.

SUMMARY

Transformation hierarchies and effects trees may be defined in the same user interface by treating animated transformations as another type of time-varying data stream. Effects operators in the effect tree are provided with an input to receive a transformation. The effects operators that output images can be set to either use a transformation specified by using the effect's parameter controls, or use an input transformation, or both. Transform operators that output only transformations may use user-specified parameters to output transformations, or may operate on transformation data input from another transform operator. If there is no input connected to a transform operator, the transform operator can still generate its own local transform. In the user interface, the user can connect the output of one transformation operator to one or more operators (e.g., parent to children) using the same output to input port connections as used for images and effects operators. The result of a graph of transformation operators is then visually connected to the input of the image processing (rendering or rasterizing) effect, such as a DVE, that is capable of using the final transformation. The user can then identify clearly which image effects are consumers of the transformation matrices. Using the data flow user interface, it also becomes possible to supply the same transformation as input to several image processing effects.

The concept of the transform operators may be extended to any kind of metadata. In the data flow user interface, an operator may generate or transform metadata of a particular type. If the operator has an input, it transforms the input according to its internal parameters, and optionally a pre-transform. The outputs of these metadata operators also may be used by other operators as inputs to control operations performed by those other operators.

DETAILED DESCRIPTION

A transformation is a metadata that describes the change applied to the geometry of an object. The object may be, for example, an image, for which the geometry is defined by the location of the image pixels. Mathematically, a four-by-four matrix may be used to represent a transformation applied to a point in three-dimensional space. The matrix is composed of scaling and rotation components around a pivot point, and a translation component. It can optionally include a projection component that is defined by viewing or "camera" parameters such as position, up-vector and field of view.

Figure 1:
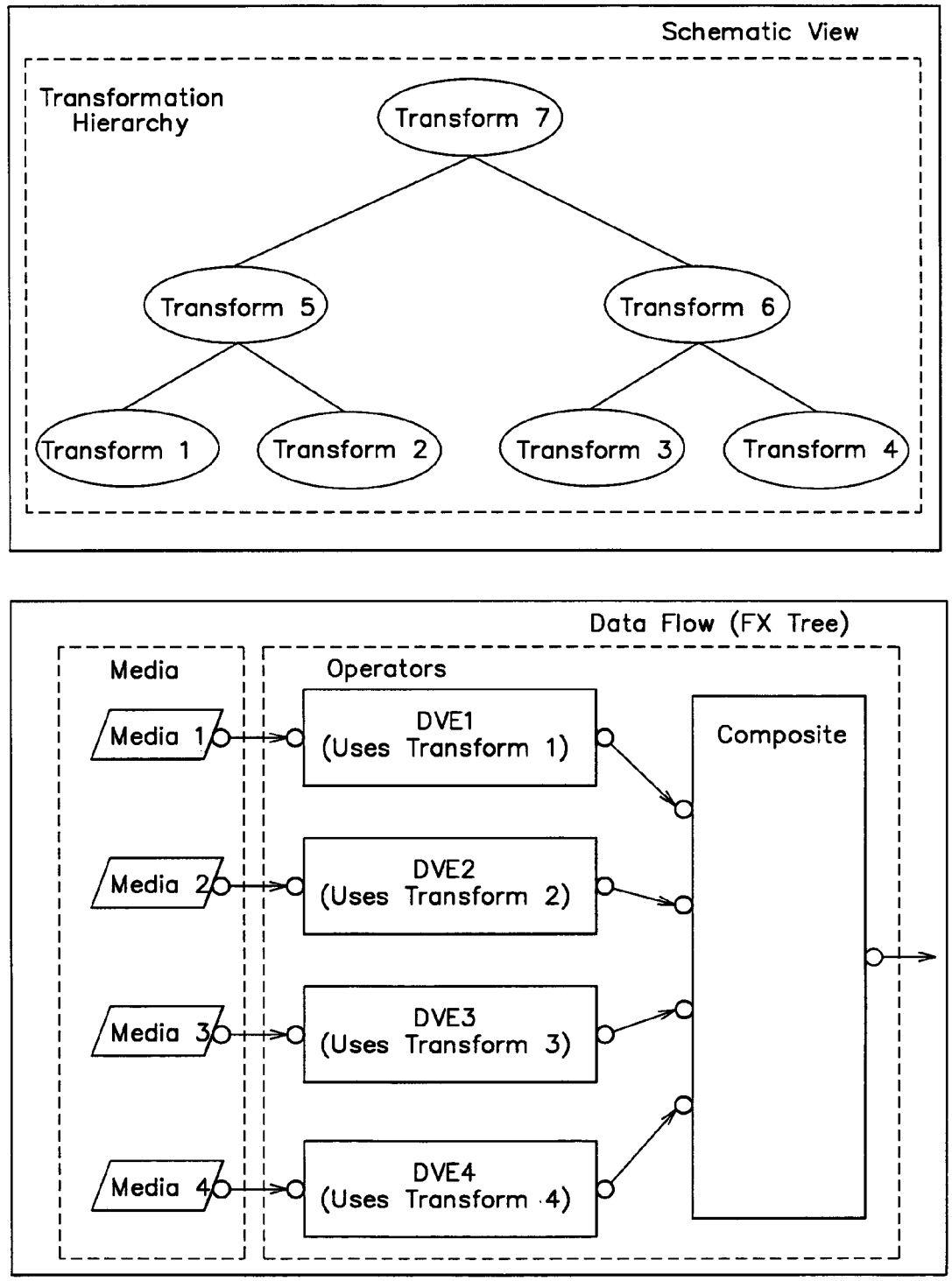
FIG. 1 is a diagram of a conventional user interface with a schematic view separate from a a data flow user interface.

Referring now to FIG. 1, a conventional transform hierarchy is shown in a schematic view, with the schematic view adjacent to a conventional effects tree user interface. Each transform node is a descendant of a parent transform node, such as Transform 1 is a descendant or child of Transform 5. In the effects tree interface, an operator such as DVE1 is associated with a transform such as Transform1. To modify transform 1, the user accesses the transform hierarchy in the schematic view.

Figure 2:
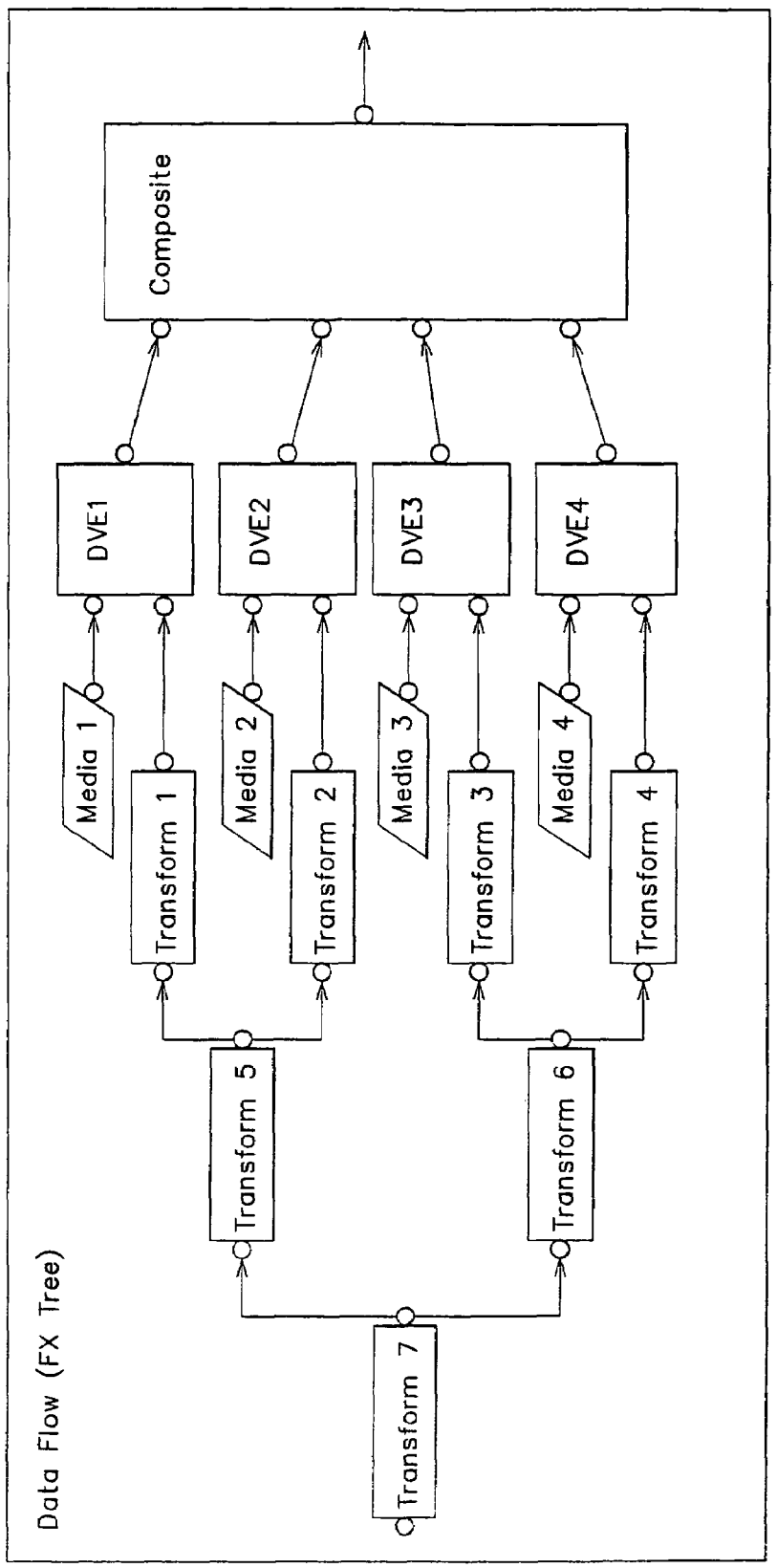
FIG. 2 is a diagram of a combined transform hierarchy showing the specification of a typical parent-child relationship and effects tree in a data flow user interface.

Referring now to FIG. 2, transformation hierarchies and effects trees may be defined in the same user interface by treating animated transformations as another type of time-varying data stream. An example is shown in FIG. 2. A transform hierarchy is defined by Transforms 1 through 7. Because Transform 7 has no input, it acts as a transform generator. All other transform operators have a local transform matrix that is concatenated with the transform matrix received at its input. With this data flow user interface, the association between the image processing and transform operators is clearer.

To achieve a parent-child constraint relationship, as specified in a traditional schematic view, the transform operator operates on the input stream by multiplying the input transformation matrix with its local matrix.

[Output]=[Post-transform][Local transform]

This relationship requires one input to the transform operator to be treated as a post-transform matrix. Used as such, a single transform operator connected to the inputs of multiple transform operators applies a global transformation to all of them.

Because the data flow user interface permits multiple inputs to be specified for a single operator, two different inputs can be specified in the transform operators—one for a pre-transform and another for a post-transform. The operator then concatenates these input matrices with its own local transform using the following matrix multiplication

[Output]=[Post-transform][[Local transform][Pre-transform]]

It now becomes possible to have the pre-transform input of multiple transform operators connected to the output of the same transform operator. A single operator can now be used to simultaneously manipulate the local transforms of several transform operators.

Each kind of operator that operates on time-varying data, whether a transform operator, effects operator or operator for other kinds of data, uses a "pull" model to obtain the values for its inputs for each period of time for which it generates an output. Using the relationships among operators defined by the data flow interface, each operator sends a "pull" request to operators that connect to each of its inputs. The pull request identifies the type of data the operator expects to receive. For example, the operator may expect image data, a transform or another kind of data. The operator receiving a request generates the requested data and provides it to the requesting operator. In the process of generating the requested data, an operator may, in a recursive operation, issue its own set of pull requests to yet further operators connected to its inputs.

Figure 3:
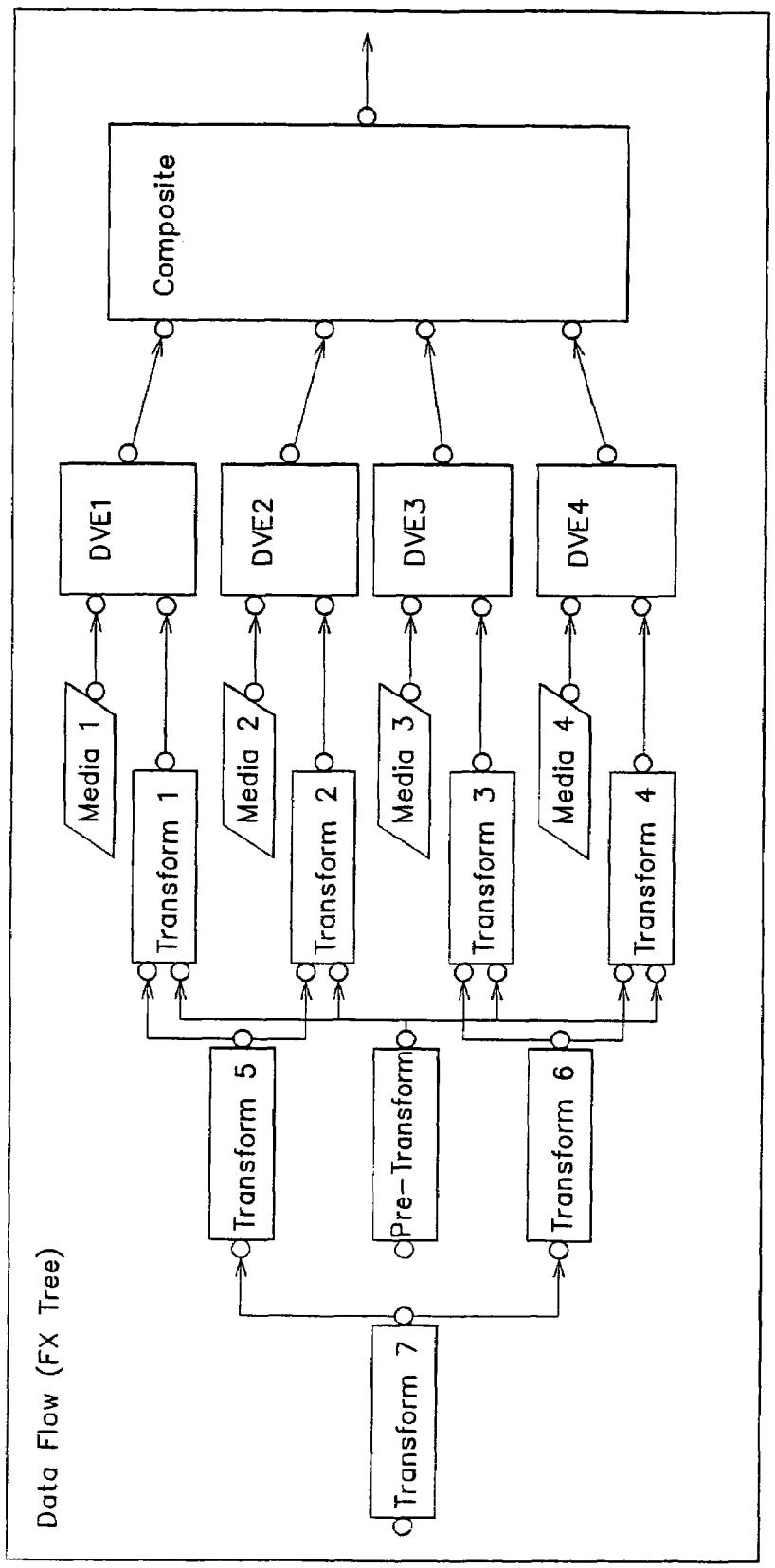
FIG. 3 also is a diagram of a combined transform hierarchy and effects tree in a data flow user interface illustrating both pre-transform and post-transform hierarchies.

Referring now to FIG. 3, an example of how post-transforms and pre-transforms are used simultaneously will now be described. A pre-transform (PreTransform in FIG. 3) is applied to an input of a transform, e.g., Transform2. Transform2 also has an input that is connected to the output of Transform5, its post-transform. Thus, Transform 2 provides as its output the concatenation of the post-transform, its local transform and a pre-transform.

The new workflow offers the several advantages. First, transformation hierarchies are shown in context with the image (and possibly other media) data flow. Second, by treating transformations as another media stream, the user interface to build data transformation hierarchies is the same as used for other types of media such as images. Third, a port-based data input connection paradigm allows the user to specify post-transform input for traditional parenting applications, and a pre-transform input for simultaneous manipulation of objects in their local space by a single transform generator. Fourth, data sharing between different image processing effects now becomes possible by connecting the output of a transformation operator to several effects that can take transformations as input.

This paradigm also allows for specialized transform operators, such as transform-generators and transform-manipulators. A tracker operator is an example of a transform generator. This operator has an image reference input that is used to perform tracking. After the tracking is finished, the image input can be disconnected and the tracking transformation data used to drive the transformation of multiple DVEs. The tracker can even be copied and pasted in other trees, saved as preset, and even used in other sequences. An invert transform operator is an example of a transform manipulator. It simply inverts the transformation matrix. This manipulator allows for an effect of a particular transform to be undone. For example, a common workflow is to stabilize an image sequence using a tracker transform before performing rotoscopy. Rotoscopy is typically followed by a de-stabilization using the inverse transform to return to the original movement in the sequence. These additional kinds of transformation operators can be added to an interconnection of transforms in the user interfaces such as shown in FIGS. 2-3.

Finally, transformations are just one example of many other metadata objects that can be treated as a data streams in the data flow user interface. Other types of time-varying meta data object streams can be provided and operators on these streams can be defined. Examples of other metadata types of interest include, but are not limited to, metasync data, property animation curves, vector data, Z-depth, etc. For example, properties of time varying operators, including but not limited to transform operators and effects operators, also may be considered to be a meta-data type. Nodes in the data flow interface can show an output and input user interface for time-varying animated properties of the corresponding effect. Connections between these property ports can show the flow of property values from one node to another. Special nodes can operate on the properties specified as input, to output new values for a specified time. Similar to the transformation hierarchies, this user interface schema allows for the user to build complicated expressions on the property values, while visualizing it in context with the other types of data flow.

The various components of the user interface described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, such as "C++," Visual Basic, JAVA or other language, such as a scripting language or even assembly language. The computer system may also be specially programmed, special purpose hardware. In a general-purpose computer system, the processor is typically a commercially available processor, such as various processors available from Intel, AMD, Cyrix, Motorola, and IBM. The general-purpose computer also typically has an operating system, which controls the execution of other computer programs and provides scheduling, debugging, input/output control, accounting, compilation, storage assignment, data management and memory management, and communication control and related services. Example operating systems include, but are not limited to, the UNIX operating system and those available from Microsoft and Apple Computer.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A graphical user interface comprising:
    an editing window;
    means for enabling a user to interactively edit in the editing window one or more tansformation hierarchies including one or more geometrical transformation operators employing mathematical matrices, wherein a transformation operator provides transformation data as an output, wherein the output transformation data does not include image data;
    means for enabling a user to interactively edit in the editing window one or more effects trees including effects operators, wherein at least one effect operator in the effect tree has one or more inputs for receiving transformation data and has a local transformation specification that is combined with the received transformation data; and
    means for enabling a user to connect an output of a transformation operator to an input of an effect operator for receiving the transformation data;
    a display operable to present the editing window including both the one or more transformation hierarchies and the one or more effects trees to the user.

2. The graphical user interface of claim 1, wherein an effect operator also has an input for receiving image data and an output for providing the received image data processed according to the transformation data.

3. The graphical user interface of claim 1, wherein the received transformation data is combined with the local transformation specification of the effect operator as a pre-transform.

4. The graphical user interface of claim 1, wherein the received transformation data is combined with the local transformation specification of the effect operator as a post-transform.

5. The graphical user interface of claim 1, wherein transform operators in a transformation hierarchy and effect operators in an effect tree are both kinds of time-varying objects.

* * * * *